(12) United States Patent
Korman et al.

(10) Patent No.: US 8,695,420 B1
(45) Date of Patent: Apr. 15, 2014

(54) LIQUID LEVEL SENSING SYSTEM

(75) Inventors: Valentin Korman, Huntsville, AL (US); John T. Wiley, Huntsville, AL (US); Amanda G. Duffell, Gurley, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 279 days.

(21) Appl. No.: 12/827,598

(22) Filed: Jun. 30, 2010

(51) Int. Cl.
*G01F 23/00* (2006.01)

(52) U.S. Cl.
USPC .......................................................... 73/293

(58) Field of Classification Search
USPC ......... 340/619; 250/577, 901, 277; 73/290 V, 73/293
See application file for complete search history.

(56) References Cited

U.S. PATENT DOCUMENTS

| | | | |
|---|---|---|---|
| 4,505,542 A | 3/1985 | Clarke | 385/127 |
| 6,272,060 B1 | 8/2001 | Sheen et al. | 365/221 |
| 6,965,708 B2 | 11/2005 | Luo et al. | 385/12 |
| 7,294,458 B2 | 11/2007 | Philpott et al. | 435/5 |
| 7,344,830 B2 | 3/2008 | Philpott et al. | 435/5 |
| 7,710,567 B1 * | 5/2010 | Mentzer et al. | 356/436 |
| 2004/0021100 A1 | 2/2004 | Gouzman et al. | 250/573 |
| 2004/0027137 A1 | 2/2004 | Sherrard | 324/644 |
| 2008/0089367 A1 | 4/2008 | Srinivasan et al. | 372/19 |
| 2009/0129721 A1 | 5/2009 | Chen et al. | 385/12 |

* cited by examiner

*Primary Examiner* — Peter Macchiarolo
*Assistant Examiner* — Tamiko Bellamy
(74) *Attorney, Agent, or Firm* — Peter J. Van Bergen; James J. McGroary

(57) ABSTRACT

A liquid level sensing system includes waveguides disposed in a liquid and distributed along a path with a gap between adjacent waveguides. A source introduces electromagnetic energy into the waveguides at a first end of the path. A portion of the electromagnetic energy exits the waveguides at a second end of the path. A detector measures the portion of the electromagnetic energy exiting the second end of the path.

12 Claims, 2 Drawing Sheets

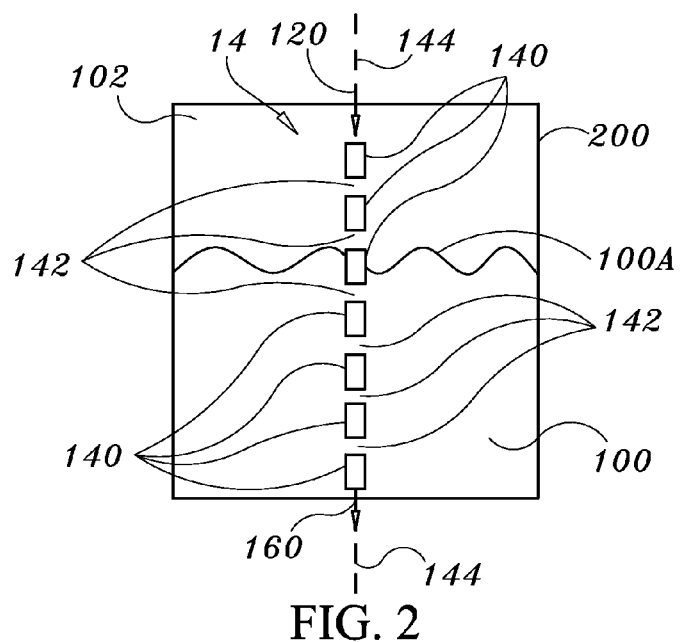
FIG. 2
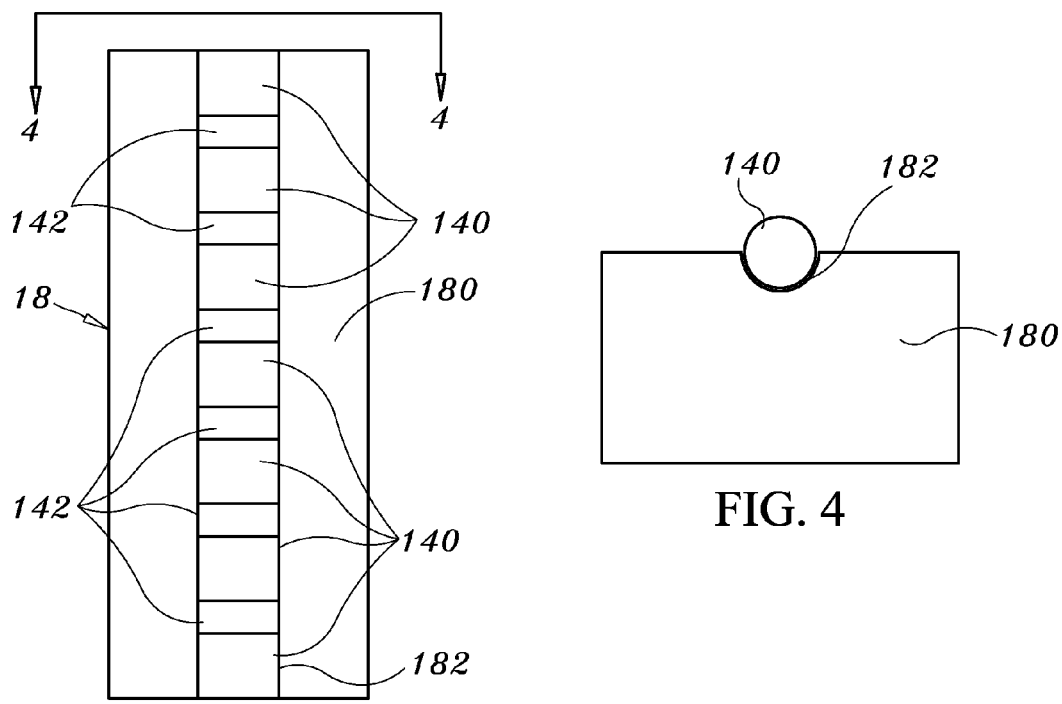
FIG. 3
FIG. 4

LIQUID LEVEL SENSING SYSTEM

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of the Invention

This invention relates to liquid level sensing. More specifically, the invention is a liquid level sensing system using a form of electromagnetic energy such as optical energy.

2. Description of the Related Art

Typical liquid level sensing systems that measure the amount of cryogenic liquid in a tank use differential pressure measurement, capacitance measurements, or measurements made with a series of temperature or thermal resistance sensing devices in a rake or array configuration. Differential pressure measurements only work well in non-flowing conditions. Capacitance measurements do not work well when used in thermal gradients and dynamic flow conditions. Thermal measurement systems utilize the thermal change between a cryogenic liquid's gas-to-liquid fluid phases, and are limited by thermal latency or the time it takes for the thermal sensing elements to respond to a temperature change. In addition, the surface boundary in cryogenic liquid storage (i.e., the ullage layer) transitions from liquid to saturated vapor to gas. The temperature of the saturated vapor layer is very close to that of the liquid layer. This makes it difficult for a temperature-based system to resolve the true liquid boundary in a tank. Still further, the accuracy and resolution of conventional liquid level sensing systems are determined by the number of sensing elements. Since the number of sensing elements is typically tied to individual data channels, substantial data acquisition systems are usually required to achieve accurate results.

SUMMARY OF THE INVENTION

Accordingly, it is an object of the present invention to provide a liquid level sensing system.

Another object of the present invention is to provide a liquid level sensing system having a reduced number of data sensing elements and data acquisition channels.

Still another object of the present invention is to provide a liquid level sensing system that does not rely on the use of pressure, capacitance or thermal sensing technology.

Other objects and advantages of the present invention will become more obvious hereinafter in the specification and drawings.

In accordance with the present invention, a liquid level sensing system includes a plurality of waveguides distributed along a path with a gap between adjacent waveguides. The path has a first end and a second end. A source introduces electromagnetic energy into the waveguides at the first end of the path. A portion of the electromagnetic energy exits the waveguides at the second end of the path. A detector measures the portion of the electromagnetic energy exiting the second end of the path. The waveguides are disposed in a liquid whose level is to be measured.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 2 is an isolated schematic view of a waveguide segments sensor used in the present invention;

FIG. 3 is a plan view of a waveguide support with a plurality of waveguide segments mounted therein in accordance with an embodiment of the present invention; and FIG. 4 is an end view of the waveguide support taken along line 4-4 in FIG. 3.

DESCRIPTION OF THE PREFERRED EMBODIMENT(S)

Figure 1:
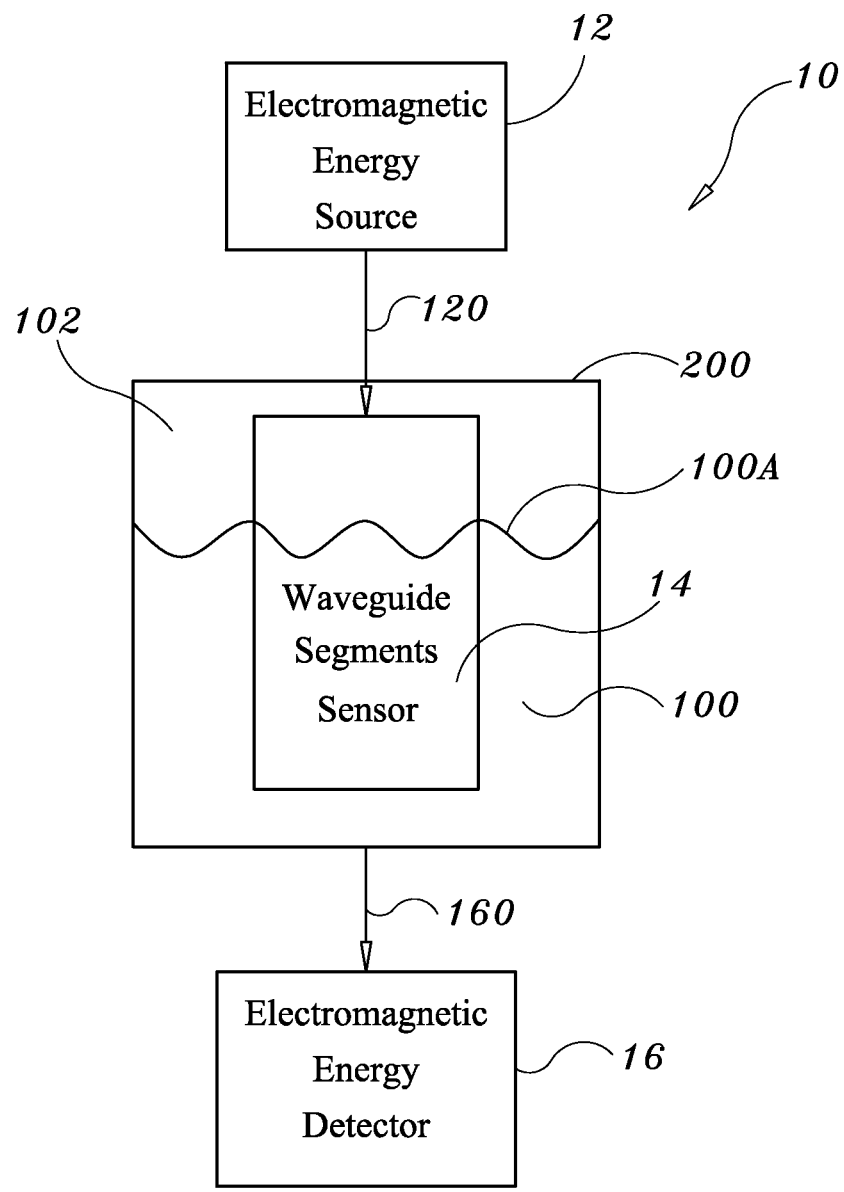
FIG. 1 is a top-level schematic view of a liquid level sensing system in accordance with the present invention.

Referring now to the drawings and more particularly to FIG. 1, a liquid level sensing system in accordance with the present invention is shown and is referenced generally by numeral 10. System 10 is used to determine the level of a liquid 100 in a reservoir or tank 200. Liquid 100 can be a cryogenic on non-cryogenic liquid with the space 102 above the surface 100A of liquid 100 being non-liquid (i.e., a saturated vapor or gas). It is to be understood that liquid 100 and tank 200 are not limitations of the present invention.

Liquid level sensing system 10 includes an electromagnetic energy source 12 (e.g., an optical energy source such as a laser), a waveguide segments sensor 14, and an electromagnetic (e.g., optical) energy detector 16. Source 12 and detector 16 are tuned to the same wavelength(s) of operation. The particular wavelength(s) should be such that the electromagnetic (e.g., optical) energy will not be absorbed by the particular liquid 100 whose liquid is being sensed. In general, waveguide segments sensor 14 is disposed in liquid 100 along a path (e.g., straightline vertical path in the case of a tank/liquid subject to the forces of gravity) between source 12 and detector 16 such that sensor 14 will be sensitive to relevant levels of liquid 100 in tank 200.

Referring additionally now to FIG. 2, sensor 14 is illustrated in an isolated schematic view in order to explain the operating principles of the present invention. Sensor 14 includes a number of waveguides 140 separated from one another by gaps 142. Sensor 14 is configured such that gaps 142 fill with liquid 100, the non-liquid in space 102, or a combination of the two, depending on their position in tank 200 and the level of liquid 100 therein. Waveguides 140 and gaps 142 are distributed along a substantially straightline path designated by dashed line 144. In a normal gravity environment, sensor 14 is positioned such that straightline path 144 is in a substantially vertical orientation in tank 200 in order to measure the level liquid 100 in tank 200. However, it is to be understood that the orientation of sensor 14 can be changed to satisfy the needs of a particular application without departing from the scope of the present invention.

Each of waveguides 140 will generally by the same type of waveguide (e.g., rigid light pipe, flexible optical fiber, optical lens, or any other waveguide that can contain the electromagnetic energy produced by source 12) with known transmission properties. For processing simplicity, the length $L_w$ of each waveguide 140 should be the same as should the length $L_G$ of each gap 142, although $L_W$ does not need to equal $L_G$. Typically, $L_G$ is much smaller than $L_W$ and is dependent on the amount of energy loss caused thereby for the wavelength(s) of the electromagnetic energy. The resolution of sensor 14 is defined by the length of waveguides 140 and gaps 142.

By way of example, operation of the present invention will be explained for the case where source 12 is an optical energy source. A known amount of optical energy 120 (of a wavelength that will not be absorbed by liquid 100) is introduced at one end of sensor 14. As optical energy 120 propagates along path 144, it passes through successive ones of waveguides 140 and gaps 142. When a gap 142 resides in space 102 above the surface 100A of liquid 100, attenuation of optical energy 120 will be different than when a gap 142 is in liquid 100. Accordingly, when the attenuated portion of optical energy 120 exits sensor 14 as optical energy 160, such attenuated optical energy 160 is indicative of the level of liquid 100 in tank 200 once sensor 14 has been calibrated for a particular optical energy 120 and liquid 100. Methods of calibration would be readily understood by persons of ordinary skill in the art. Attenuated optical energy 160 is provided to detector 16 where the level of optical energy 160 can be converted to a level of liquid 100 based on the calibration of sensor 14.

Sensor 14 in its straightline orientation can be realized by a variety of embodiments without departing from the scope of the present invention. By way of example, one such embodiment is illustrated in FIGS. 3 and 4 where a rigid support body 18 is used to support and position waveguides 140 therein with gaps 142 defined therebetween. More specifically, support body is a rigid housing 180 with a channel 182 formed along the length thereof. Waveguides 140 can be fitted and/or glued in channel 182. To minimize any effects of support body 180 on the electromagnetic energy propagating along and through waveguides 140 and gaps 142, support body 180 is typically made from a material that is non-transmissive, non-reflective and non-absorptive with respect to the wavelength(s) of electromagnetic energy propagating through waveguides 140/gaps 142. Another option is to coat channel 182 with a non-transmissive, non-reflective and non-absorptive coating. For example, for optical energy having a wavelength in the approximate range of 350-750 nanometers (i.e., the visible spectrum), suitable coating materials for channel 182 that will not affect the optical energy include, for example, certain powder coatings, graphite coating, black paint, etc. Another option is to enclose the waveguides in a suitable sheathing.

The advantages of the present invention are numerous. The waveguide segments sensor defines a single data channel capable of detecting all liquid levels of interest in a reservoir. Accuracy/resolution are readily defined by waveguide and gap length. The use of optical energy and optical elements means that the system will be inherently safe for sterile liquids, explosive liquids, toxic liquids, etc., and can be used for both cryogenic and non-cryogenic liquids.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A liquid level sensing system, comprising:
    at least three waveguides distributed along a vertically-oriented straight optical path with a gap between adjacent ones of said waveguides, said path having a first end and a second end;
    a source for introducing electromagnetic energy into said waveguides at said first end of said path wherein a portion of said electromagnetic energy exits said waveguides at said second end of said path; and
    a detector for measuring said portion of said electromagnetic energy.

2. A liquid level sensing system as in claim 1, wherein said waveguides are selected from the group consisting of rigid light pipes, flexible optical fibers, and lenses.

3. A liquid level sensing system as in claim 1, wherein each said gap is identically sized along said path.

4. A liquid level sensing system as in claim 1, wherein each of said waveguides is identically sized along said path.

5. A liquid level sensing system as in claim 1, wherein each of said waveguides is defined by a first length along said path and each said gap is defined by a second length along said path.

6. A liquid level sensing system as in claim 1, wherein said waveguides are adapted to be disposed in a liquid, and wherein said electromagnetic energy has a wavelength that is not absorbed by the liquid.

7. A liquid level sensing system, comprising:
    a rigid support;
    at least three optical waveguides coupled to said support along a straight path with a gap between adjacent ones of said waveguides, said path having a first end and a second end;
    said rigid support with said waveguides coupled thereto positioned to place said path in a vertical orientation;
    a source for introducing optical energy into said waveguides at said first end of said path wherein a portion of said optical energy exits said waveguides at said second end of said path; and
    a detector for measuring said portion of said optical energy.

8. A liquid level sensing system as in claim 7, wherein said waveguides are selected from the group consisting of rigid light pipes, flexible optical fibers, and lenses.

9. A liquid level sensing system as in claim 7, wherein each said gap is identically sized along said path.

10. A liquid level sensing system as in claim 7, wherein each of said waveguides is identically sized along said path.

11. A liquid level sensing system as in claim 7, wherein each of said waveguides is defined by a first length along said path and each said gap is defined by a second length along said path.

12. A liquid level sensing system as in claim 7, wherein said support with said waveguides coupled thereto are adapted to be disposed in a liquid, and wherein said optical energy has a wavelength that is not absorbed by the liquid.

* * * * *